Sept. 29, 1959  F. W. MEREDITH  2,907,031
STABILISING DEVICES
Filed May 28, 1953  4 Sheets-Sheet 1

Sept. 29, 1959     F. W. MEREDITH     2,907,031
STABILISING DEVICES
Filed May 28, 1953     4 Sheets-Sheet 3

INVENTOR:
F. W. MEREDITH
By:
Moore & Hall
ATTORNEYS

Sept. 29, 1959         F. W. MEREDITH         2,907,031
                       STABILISING DEVICES
Filed May 28, 1953                            4 Sheets-Sheet 4

United States Patent Office 2,907,031
Patented Sept. 29, 1959

2,907,031

STABILISING DEVICES

Frederick William Meredith, Cleeve Hill, Cheltenham, England, assignor to Smiths America Corporation, Ruxton, Maryland Application May 28, 1953, Serial No. 358,203

8 Claims. (Cl. 343—757)

The present invention relates to the mounting of radiant energy beam scanning systems, such as radar aerial systems or infra red scanning systems (used for either transmission or reception, or for both transmission and reception) upon moving vehicles, such as aircraft which systems comprise a passive reflector element or "dish" and an emitter or receptor (hereinafter referred to as the "emitter") suitably located with respect to the dish and connected through suitable means (such as, in the case of a radar system, a wave-guide or transmission line) to the remainder of the installation, and more particularly to such systems of the kind in which an axis of the system is gyroscopically stabilised, that is to say, motion of the vehicle does not affect the location of the axis.

Systems of this kind have associated with them what might be called a beam axis, an on target position of the system being one in which the beam axis passes through a desired target, i.e. one in which the sight line and beam axis are coincident. The position of the beam axis will depend upon the positioning of the dish and emitter, and relative movement of dish and emitter will produce movement of the beam axis, the ratio of movement of the beam axis to movement of the dish axis depending upon the geometry of the arrangement.

It has been proposed to provide systems of this kind in which the emitter is fixed relative to the dish and the dish is attached by a parallel motion linkage to the inner gimbal of a gyroscope so that the axes of the gyroscope rotor and the dish remain parallel. The direction of the dish (and hence of the beam axis) can then be controlled by applying precessing torques to the gyroscope gimbal system. An arrangement such as this has the disadvantage that a very large gyroscope is required in order to overcome the inertia of the dish and its associated parts without the nutation frequency becoming too low for the requisite speed of location of the axis of the dish (and of the beam axis). A further disadvantage is that even if a large gyroscope is used the friction associated with the dish and components attached thereto causes unpredictable precession of the gyroscope, so that the rate of movement of the beam axis will not be accurately known from the precessing torques applied to the gyroscope. Still a further disadvantage is that if large "aim off" angles are required (as they may be, the sight line in certain circumstances being as much as 45° from its normal datum) the torques applied to the gyro gimbals will not be normal to the rotor spin axis, and so they will no longer closely represent the rate of rotation of the line of sight.

In order to overcome these difficulties it has been proposed to provide servo mechanisms to operate on the dish and maintain the beam axis in alignment with the rotor axis of a small gyroscope. Such a system requires that the servo mechanisms be extremely fast in order to compensate for angular motion of the vehicle. If they are not sufficiently fast, any oscillation of the vehicle will result in a motion of the beam axis; and if apparent angular movement of the sight line is used to control the steering of the vehicle there will be a feed back loop via the control system for such an oscillation and instability may result. A suggested method of overcoming this difficulty is to combine the measurement of the angle between the sight line and the beam axis (derived from the remainder of the installation) with the local measurement of the angle between the beam axis and the gyro rotor axis to give a measure of the misalignment between gyro rotor axis and sight line. Any error in location is only eliminated satisfactorily from the sight line information if the two angles, sight line to beam axis, and beam axis to gyro spin axis can be accurately measured. Usually the signal corresponding to misalignment between beam axis and sight line does not vary linearly with this angle, and it is moreover affected by the presence of more than one target within the field of the scanning system. If in such an arrangement signals from the system are used to control the vehicle instability can still arise unless exceptionally rapidly-acting servo systems are used to control the dish from the gyroscope.

It is an object of the present invention to provide a gyroscopically-stabilised system of the kind referred to in which the direction of the beam axis is substantially unaffected by motion of the vehicle, and which does not involve the use of exceptionally rapidly acting servo systems to position the dish.

According to the present invention we provide, in a system of the kind referred to, a platform, said platform being mounted upon the vehicle and supporting the dish, a first stabilising gyroscope mounted upon said platform, said gyroscope having its spin axis substantially parallel to the beam axis, said gyroscope having an outer gimbal ring pivotally mounted with respect to said platform about a first outer gimbal axis at right angles to the spin axis, a first linkage connecting the first outer gimbal ring and dish, said first linkage being such that the gyroscope spin axis and the beam axis turn through equal angles about the first outer gimbal axis relative to the platform, the dish being pivotally mounted on the platform for motion about an axis parallel to said first outer gimbal axis, an inner gimbal ring carrying the gyroscope rotor and pivotally mounted with respect to said outer gimbal ring about an axis at right angles to the spin axis and outer gimbal axis, a first anti-topple torque motor arranged to apply erecting torque to said outer gimbal ring about the outer gimbal axis, means to control the energisation of said first anti-topple torque motor in accordance with displacement of the inner gimbal ring from a position of orthogonality with the outer gimbal ring, and a first servo motor arranged to position the platform relative to the vehicle about an axis parallel to the first outer gimbal axis, together with means to control the energisation of said first servo motor in accordance with displacement between the first outer gimbal ring and platform.

Preferably there is also provided a first precessing torque motor arranged to apply precessing torque to the inner gimbal ring about the inner gimbal axis, said first precessing torque motor being energised in accordance with misalignment between the gyro spin axis and a datum direction. The datum may be constituted by the line of sight, in which case the first precessing torque motor is energised by a signal in accordance with displacement between beam axis and sight line derived from the remainder of the installation.

A system as stated is adapted to stabilise the dish in one plane; and preferably there is also provided a second stabilising gyroscope whose spin axis is substantially parallel to the beam axis, said second gyroscope having an outer gimbal ring pivotally mounted with respect to the platform about an outer gimbal axis at right angles to both the spin axis and the first outer gimbal axis, a second linkage connecting, the second outer gimbal ring and dish, said second linkage being such that the gyroscope spin axis and the beam axis turn through equal angles about the second outer gimbal axis relative to the platform, the dish being mounted on the platform for motion about an axis parallel to said second outer gimbal axis, the said second gyroscope having associated therewith an inner gimbal ring, precessing and erecting torque motors and means to control their energisation equivalent to those associated with the first gyroscope, and a second servo motor arranged to position the platform about an axis parallel to the second outer gimbal axis together with means to control said second servo motor in accordance with displacement between the second outer gimbal ring and platform. The beam axis is then controlled and stabilised in space to align the beam axis with the sight line.

Preferably the emitter is separately mounted from the dish and rigidly located with respect to the platform, and the dish is gimballed in such a manner as to make its angular movements relative to the platform about a point on its axis, each gyroscope being coupled to the dish through a reduction mechanism whose ratio is the inverse of the ratio of angular movement of the dish to the resultant angular movement of the beam. For example, in the case of a beam of light, if the dish is gimballed to make its movements about the point at which its axis meets the dish, the gyroscopes are coupled to the dish through a two-to-one reduction mechanism.

Preferably also the platform is located by virtual gimbals about a point close to the plane of the dish aperture in a known manner so as to reduce the volume swept by the dish when the platform moves through large angles.

In an arrangement embodying the features mentioned, with comparatively slowly acting platform servo motors, the outer gimbal ring displacement can be kept small, e.g. of the order of 4°, and also the inner gimbal rings of the gyroscope are not frictionally loaded by the dish, while the position of the beam axis is substantially unaffected by motion of the vehicle. The torques applied about the inner gimbals of the gyroscopes will provide an accurate indication of the components of rate of rotation of the line of sight in the first and second planes and may be used to provide information for the steering of the vehicle. Also the beam axis can be deflected through an angle substantially greater than the angle of deflection of the dish, the effective inertia due to the dish coupled to the gyroscopes is then being considerably less than that with a one-to-one ratio connection. In addition the gyroscopes are not loaded with inertia and friction due to the emitter and any motor used to drive it for scanning purposes.

It will be appreciated that torque reaction from friction, unbalance, or elastic restraint, is counteracted by the anti-topple torque motors.

Embodiments of the invention will now be described with reference to the accompanying drawings, of which:

Figure 2:
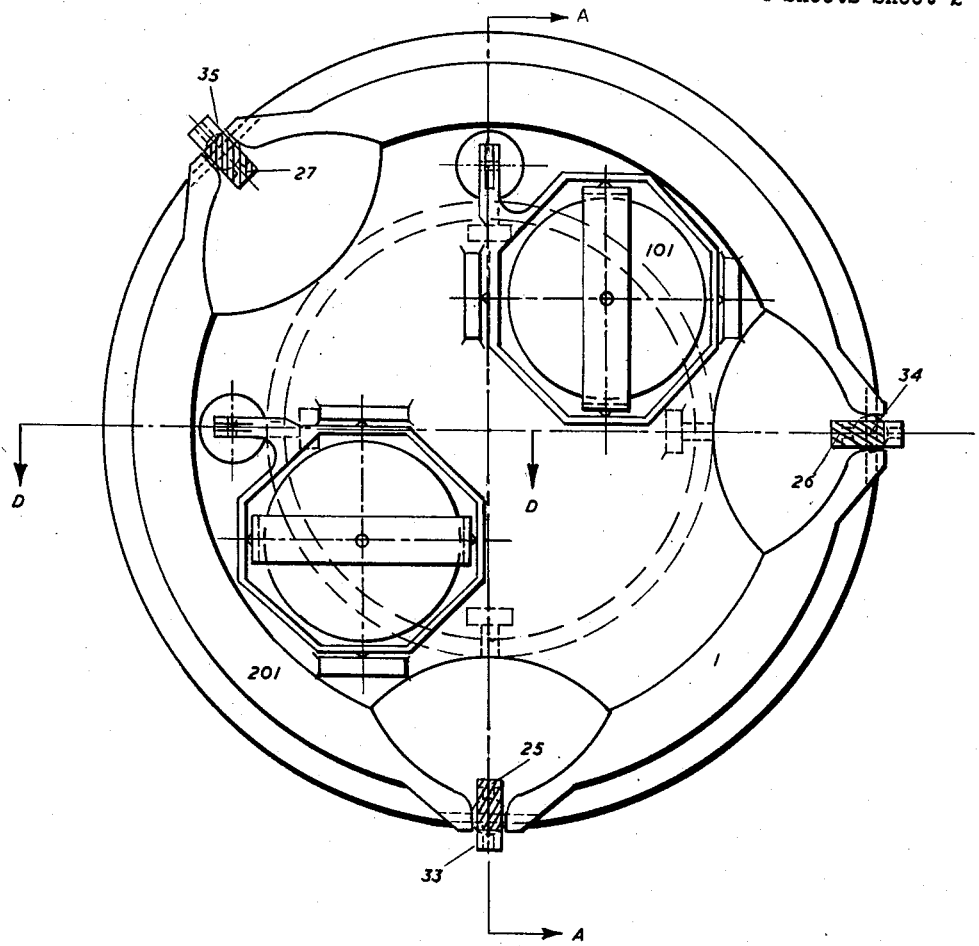
Figures 2–5 show schematically an arrangement for the stabilisation of the beam axis of a scanner system on the line of sight to a target, this involving the use of two devices such as are shown in Figure 1 acting in two planes at right angles.
Figure 3:
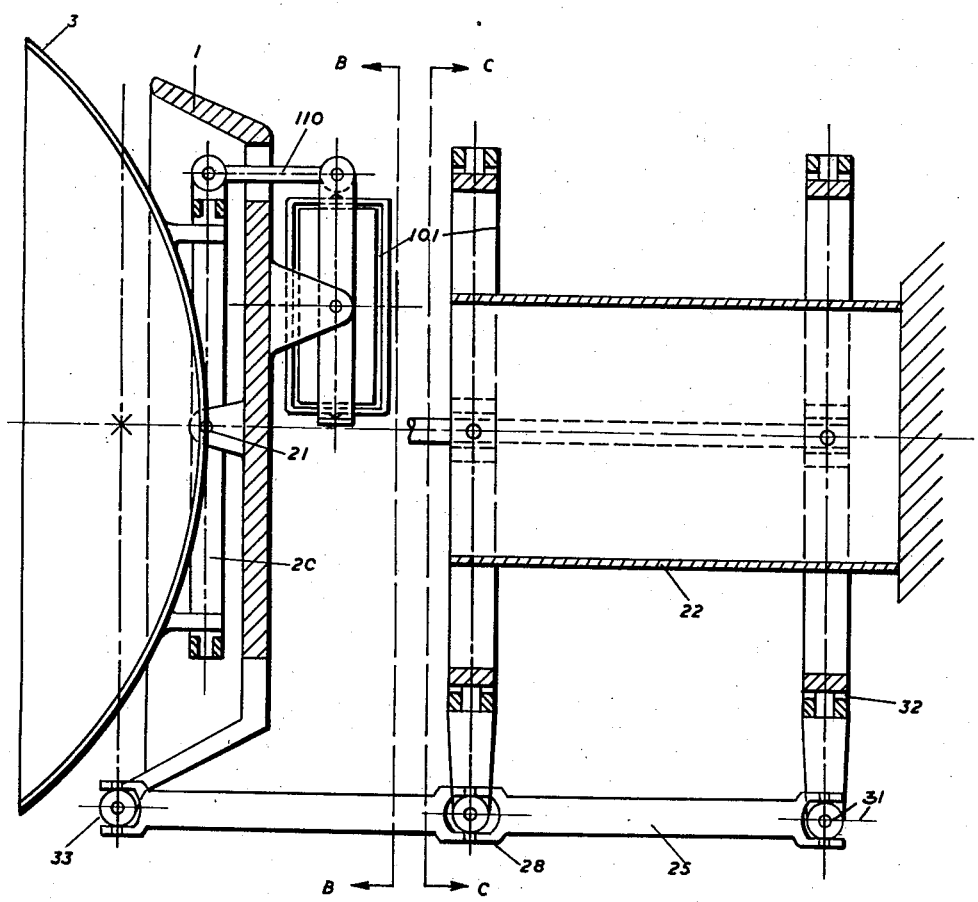

Figure 2 showing a view of the apparatus from behind the platform (in the direction of arrows B in Figure 3).

Figure 3 showing a side elevation of the apparatus (in the direction of arrows A in Figure 2).

Figure 4:
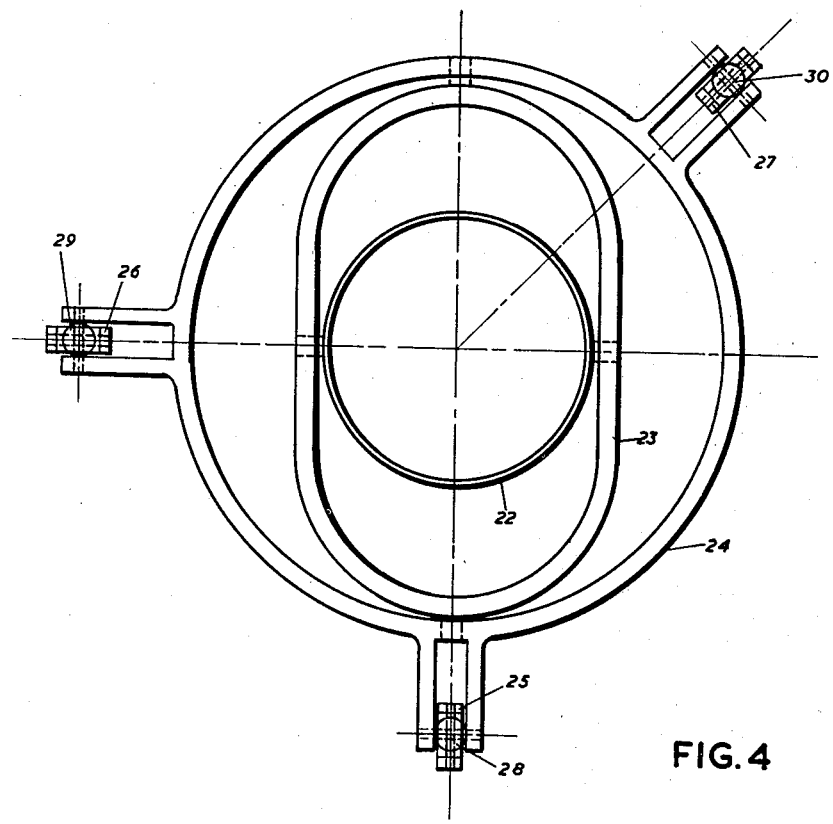

Figure 4 showing a view in the direction of arrows C in Figure 2.

Figure 5:
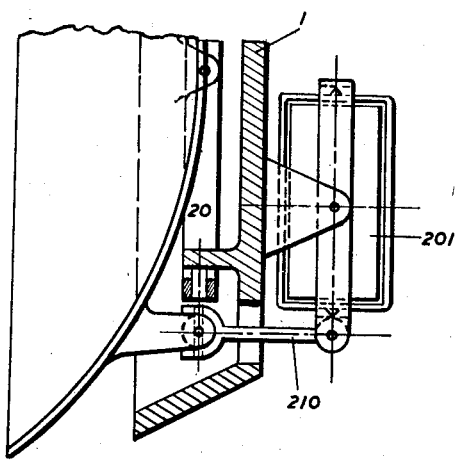

Figure 5 showing a view in the direction of arrows D in Figure 2.

Figure 1:
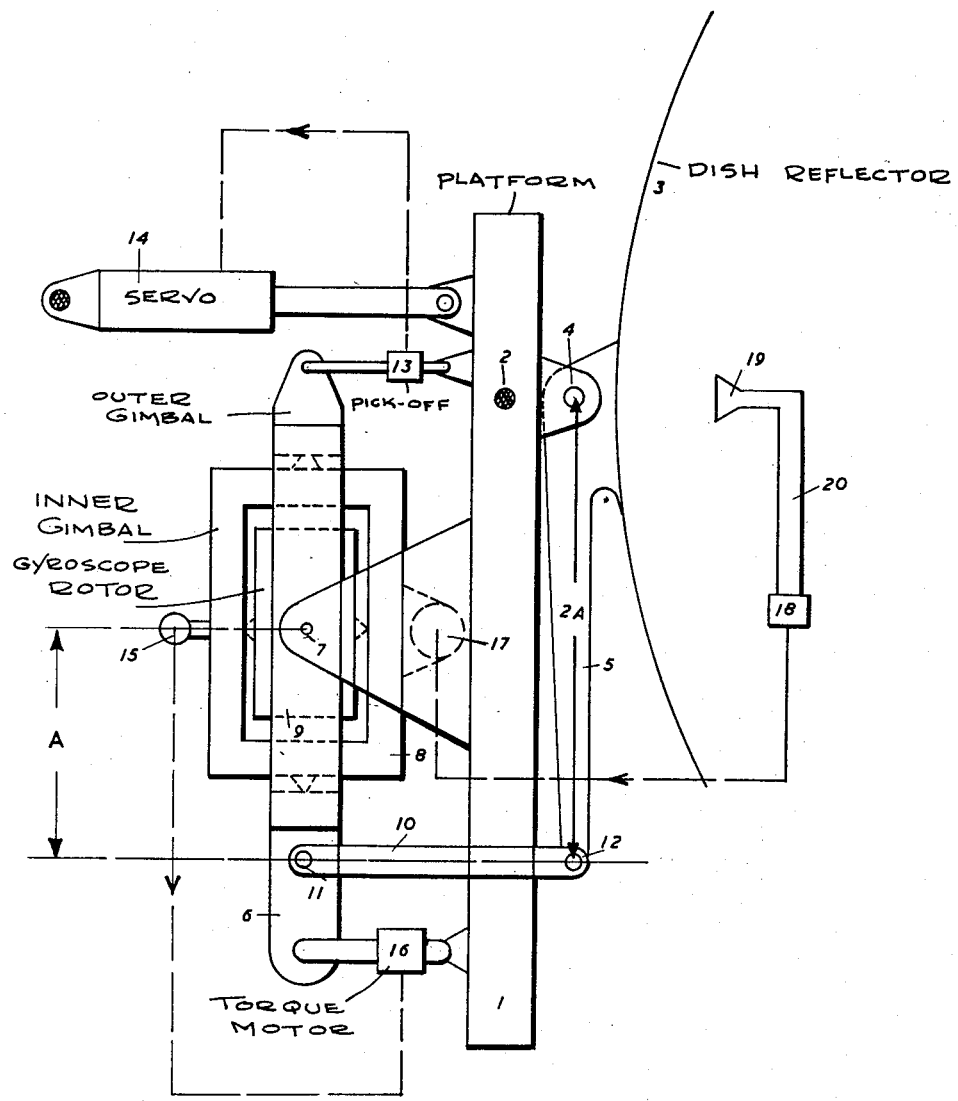
Figure 1 shows an arrangement adapted to stabilise a scanner dish in one plane.

Referring to Figure 1, there is there shown a platform 1 pivotally mounted in the vehicle about an axis perpendicular to the plane of the paper and indicated at 2. The reflector element or dish 3 is pivotally mounted on platform 1 for movement about an axis (parallel to 2) indicated at 4, the location of the dish being determined by an arm 5 rigidly attached thereto. The outer gimbal ring 6 of a gyroscope is pivotally mounted on platform 1 about an axis (parallel to 2 and 4) indicated at 7. Gimbal 6 pivotally supports an inner gimbal ring 8 which, in its turn, carries the gyroscope rotor 9. Outer gimbal ring 6 is connected to arm 5 by means of a link 10, link 10 being pivotally connected to ring 6 at 11 and to arm 5 at 12.

A pick-off device indicated at 13 is connected between gimbal ring 6 and platform 1 and gives an output in accordance with any lack of parallelism between platform 1 and gimbal ring 6. Servo motor 14, arranged so as to control the position of platform 1 about axis 2, is controlled by the output from pick-off 13 in such a manner as to maintain platform 1 parallel to gimbal ring 6.

A detector device 15 is arranged to give a signal in accordance with departure of inner gimbal ring 8 from an orthogonal position with respect to outer gimbal ring 6. Detector device 15 may thus conveniently be a two part pick-off device with one part attached to the inner gimbal ring and the other attached to the outer gimbal ring, the parts being so disposed that in the position of orthogonality the output therefrom is zero. The device may thus be similar to device 13, which may be thought of as responding either to loss of parallelism between platform 1 and gimbal ring 6 or to loss of orthogonality between the spin axis of rotor 9 and platform 1. The signal from device 15 controls the energisation of anti-topple torque motor 16, which is arranged to apply a torque to ring 6 about axis 7 in such a sense as to precess the gyroscope and restore the condition of orthogonality.

A precessing torque motor, indicated at 17 (and generally similar to torque motor 16, being a two-part device disposed between the inner gimbal ring 8 and platform 1) is arranged to apply precessing torque to inner gimbal ring 8 about the inner gimbal axis, and thus precess the gyroscope in the plane of the figure. The energisation of precessing torque motor 17 is controlled in accordance with deviation between the sight line and the beam axis. This deviation is determined by a conventional radar installation, indicated at 18, with which there is associated an emitter 19 (mounted suitably on platform 1), indicated as the flared termination of a wave-guide 20, mounted adjacent the focus of the dish 3. The spin axis of gyroscope is thus precessed in such a sense as to bring the line of sight and the beam axis (which is parallel to the spin axis), into coincidence.

The linkage between gyroscope gimbal ring 6 and dish 3 is such that the angle turned through by the dish relative to the platform is substantially half of that turned through by gimbal ring 6 relative to the platform, i.e. the distance between pivots 2 and 11. The axis of pivot 4 passes through the point at which the axis of dish 3 (which is also the beam axis) meets the dish. Thus the sight line is effectively turned through twice the angle through which the dish is turned about axis 4. It will be seen that the inertial loading on the gyroscope is thus reduced by a factor of substantially 1/4 as compared with that in an arrangement in which the dish is coupled directly to the gyroscope.

The remaining figures (2–5) show the application of the invention to the stabilisation of a scanner about an axis.

As before, the platform and dish are indicated respectively by numerals 1 and 3.

The dish is mounted for pivotal movement in azimuth in a dish gimbal ring 20, while the dish gimbal ring 20 is itself mounted for pivotal movement in elevation with respect to platform 1. The axes of the dish gimbals pass through the point (21) in which the dish axis meets the dish.

The dish is stabilised and controlled in elevation by a gyroscope 101, in all respects similar to the gyroscope of Figure 1, linked to the dish gimbal ring 20 by a link 110.

The dish is stabilised and controlled in azimuth by a gyroscope 201, also in all respects similar to the gyroscope of Figure 1, linked directly to the dish 3 by a link 210.

The gyroscopes 101 and 201 have each associated with them the precessing torque motors and anti-topple torque motors and detectors as shown for the gyroscope of Figure 1. The precessing torque motor for gyroscope 101 is energised in accordance with misalignment in elevation between sight line and scanner axis, while that for gyroscope 201 is energised in accordance with misalignment in azimuth between sight line and scanner axis. The requisite misalignment signals are derived from a conventional radar installation.

Platform 1 is mounted in the vehicle by means of a strut 22 which carries pivotally attached thereto towards the end remote from the vehicle for movement in elevation a gimbal ring 23 which in its turn has attached to it a further gimbal ring 24, 24 being pivotally mounted for movement in azimuth. Ring 24 is attached to three similar cantilever arms 25, 26, 27 adjacent their midpoints by universal joints, indicated at 28, 29, 30. The ends of the cantilever arms adjacent the base of strut 22 are attached by further universal joints (as at 31) to a second gimbal ring 32, similar in all respects to gimbal ring 24 which is attached to strut 22 via a gimbal ring similar in all respects to ring 23.

The ends of the cantilever arms away from the base of strut 22 are attached to platform 1 by means of universal joints, as indicated at 33, 34, 35, lying in a plane substantially forward of the dish gimbals, in such a manner that when the plane of rings 23 and 24 is normal to the axis of strut 22 and the dish is centralised the strut and dish axes coincide. It will be seen that the platform 1 is virtually gimballed about the point in which the plane of universal joints 33, 34, 35 cuts the axis of the strut.

The position of platform 1 is controlled by servo motors equivalent to servo motor 14 of Figure 1, or elevation servo motor, under the control of gyroscope 101, acting on gimbal ring 23 and an azimuth motor, and the control of gyroscope 201, acting on gimbal ring 24.

The emitter (not shown in Figures 2–5) is of course rigidly mounted with respect to the platform 1 as in the embodiment of Figure 1.

The manner of operation of the arrangement of Figures 2–5 will be quite obvious from the description of the manner of operation of the arrangement of Figure 1.

The detector and pick-off devices may be of any convenient form, as may also be the torque and servo motors, though the details thereof form no part of the present invention and have accordingly not been discussed. The detector and pick-off devices may for example be electric or electromagnetic, the torque and servo motors then being most conveniently electric motors, or they may be pressure-fluid control valves (either hydraulic or pneumatic), when the torque motors are most conveniently of the fluid-pressure type.

While there has been described above what are at present believed to be preferred embodiments of the invention, it will be understood that the above disclosure will readily suggest variations to those skilled in the art. All such variations must fall within the true spirit of the invention and are intended to be covered by the generic terminology of the appended claims.

I claim:

1. In a gyroscopically-stabilised radiant energy beam scanning system for a moving vehicle comprising a passive reflector dish element and an emitter, and having associated therewith a beam axis defined by said dish and emitter, the combination of a platform, said platform being mounted upon the vehicle and supporting the dish, a first stabilising gyroscope mounted upon said platform, said gyroscope having its spin axis substantially parallel to the beam axis, said gyroscope having an outer gimbal ring pivotally mounted with respect to said platform about a first outer gimbal axis at right angles to the spin axis, a first linkage connecting the first outer gimbal ring and dish, said first linkage being such that the gyroscope spin axis and the beam axis turn through equal angles about the first outer gimbal axis relative to the platform, the dish being pivotally mounted on the platform for motion about an axis parallel to said first outer gimbal axis, an inner gimbal ring carrying the gyroscope rotor and pivotally mounted with respect to said outer gimbal ring about an axis at right angles to the spin axis and outer gimbal axis, a first anti-topple torque motor arranged to apply erecting torque to said outer gimbal ring about the outer gimbal axis, means to control the energisation of said first anti-topple torque motor in accordance with displacement of the inner gimbal ring from a position of orthogonality with the outer gimbal ring, and a first servo motor arranged to position the platform relative to the vehicle about an axis parallel to the first outer gimbal axis, together with means to control the energisation of said first servo motor in accordance with displacement between the first outer gimbal ring and platform.

2. The combination set forth in claim 1, together with a first precessing torque motor arranged to apply precessing torque to the inner gimbal ring about the inner gimbal axis, and said means to control the energisation of said first precessing torque motor in accordance with misalignment between the gyro spin axis and the line of sight to a target.

3. The combination set forth in claim 2, together with a second stabilising gyroscope whose spin axis is substantially parallel to the beam axis, said second gyroscope having an outer gimbal ring pivotally mounted with respect to the platform about a second outer gimbal axis at right angles to both the spin axis and the first outer gimbal axis, a second linkage connecting the second outer gimbal ring and dish, said second linkage being such that the gyroscope spin axis and the beam axis turn through equal angles about the second outer gimbal axis relative to the platform, the dish being pivotally mounted on the platform for motion about an axis parallel to said second outer gimbal axis, a second inner gimbal ring carrying the second gyroscope rotor and pivotally mounted with respect to the second outer gimbal ring about an axis at right angles to the spin axis of the second gyroscope and the second outer gimbal axis, a second anti-topple torque motor arranged to apply erecting torque to the second outer gimbal ring about the second outer gimbal axis, means to control the energization of said second anti-topple torque motor in accordance with displacement of the second inner gimbal ring from a position of orthogonality with second outer gimbal ring, and a second servo motor arranged to position the platform about an axis parallel to the second outer gimbal axis, together with means to control said second servo motor in accordance with displacement between the second outer gimbal ring and platform.

4. The combination set forth in claim 3 wherein the platform is mounted upon the vehicle by gimbal means which locate the platform so that its angular movements take place about a point spaced from the point about which the dish makes its pivotal movements relative to the platform in a direction away from the intersection of the beam axis and the dish.

5. The combination set forth in claim 2, together with an emitter separately mounted from said dish, means to locate said emitter rigidly with respect to the platform, the dish being so pivotally mounted with respect to the platform that it makes its movements relative to the platform about a point on its axis, and the first linkage providing a reduction mechanism coupling the gyroscope to the dish, the ratio of said reduction mechanism being the inverse of the ratio of angular movement of the dish to the resultant angular movement of the beam.

6. The combination set forth in claim 2 wherein the point about which the dish makes its angular movements is that at which the beam axis meets the dish, the linkage between the outer gimbal ring and the dish providing a two-to-one reduction mechanism.

7. In combination in a gyroscopically-stabilised radiant energy beam scanning system for a movable craft comprising a platform pivotally mounted on the craft, directional antenna means having a beam axis mounted on said platform, a stabilising gyroscope mounted on said platform and having its spin axis substantially parallel to the beam axis, said gyroscope having an outer gimbal ring and an inner gimbal ring, a linkage means connecting said platform, outer gimbal ring and said antenna means and so constructed and arranged that the gyroscope spin axis and the beam axis turn through equivalent angles relative to said platform, an anti-topple torque motor connected to said outer gimbal ring for applying exerting torque to said outer ring, means to control the energization of said torque motor in accordance with displacement of said rings from a position of orthogonality with respect to each other, a servo-motor carried by the craft and arranged to position said platform relative to said craft and means to control the energization of said servo-motor in accordance with displacement between said outer ring and said platform, said combination being constructed and arranged so that said antenna alone is light and freely mounted and imposes little load, either inertial or frictional, on said gyroscope whereby the gyro is freed from the frictional load, the entire antenna system with its connections and the beam axis moves through twice the angle of movement of said directional antenna and the inertial loading is reduced to less than a third of the value it would have proportionately if the whole aerial system were moved.

8. In a gyroscopically-stabilized radiant energy beam scanning system for a movable body the combination of a platform pivotally mounted on said body and supporting an aerial having a beam axis, a first stabilizing gyroscope mounted on said platform and having its spin axis substantially parallel to the beam axis, said gyroscope having a first gimbal ring pivotally mounted with respect to said platform about a first gimbal axis at right angles to the spin axis, a first linkage connecting the first gimbal and the aerial, said linkage being such that the gyroscope spin axis and the beam axis turn through equal angles about the first gimbal axis relative to the platform, said aerial being pivotally mounted on the platform for motion about an axis parallel to said first gimbal axis, a second gimbal ring carring the gyroscope rotor and pivotally mounted with respect to said first gimbal ring about an axis at right angles to the spin axis and said first gimbal axis, and anti-topple torque motor arranged to apply erecting torque to said first gimbal ring about the axis thereof, means to control the energization of said torque motor in accordance with the displacement of said second gimbal ring from a position of orthogonality with the first gimbal ring, and a servo motor arranged to position said platform relative to the vehicle about an axis parallel to the first gimbal axis and means to control the energization of said servo motor in accordance with displacement between said first gimbal ring and said platform.

References Cited in the file of this patent

UNITED STATES PATENTS

| 2,407,275 | Hays | Sept. 10, 1946 |
| 2,475,746 | Kenyon | July 12, 1949 |
| 2,484,819 | Ferrill | Oct. 18, 1949 |
| 2,569,560 | Ford | Oct. 2, 1951 |
| 2,707,400 | Manger | May 3, 1955 |
| 2,715,776 | Knowles et al. | Aug. 23, 1955 |
| 2,795,379 | Dowker et al. | June 11, 1957 |